(No Model.)

J. I. HOKE.
HARROW TOOTH CLIP.

No. 600,076. Patented Mar. 1, 1898.

Witnesses

Inventor
John I. Hoke
Per, Alexander & Dowell
Attorneys

UNITED STATES PATENT OFFICE.

JOHN I. HOKE, OF SOUTH BEND, INDIANA.

HARROW-TOOTH CLIP.

SPECIFICATION forming part of Letters Patent No. 600,076, dated March 1, 1898.

Application filed May 7, 1897. Serial No. 635,579. (No model.)

*To all whom it may concern:*

Be it known that I, JOHN I. HOKE, of South Bend, in the county of St. Joseph and State of Indiana, have invented certain new and useful Improvements in Harrow-Tooth Clips; and I hereby declare that the following is a full, clear, and exact description thereof, reference being had to the accompanying drawings, which form part of this specification.

This invention is an improved harrow-tooth clip for attaching harrow-teeth to the harrow-bars, and is especially designed for harrows having circular or U-shaped harrow-bars.

The object of the invention is to provide a very simple clip having a single bolt and nut and so constructed that when the tooth is in position the tightening of the bolt will not only bind the tooth in the clip, but also bind the tooth and clip to the harrow-bar.

The invention therefore consists in the novel construction of the clip set forth in the claims, and the accompanying drawings illustrate the best forms thereof now known to me.

Figure 1:
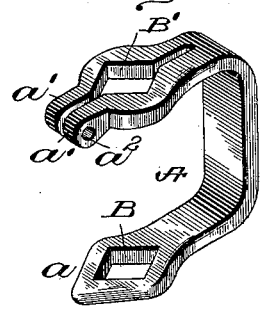
Figure 2:
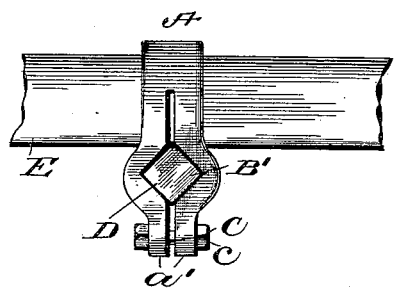
Figure 3:
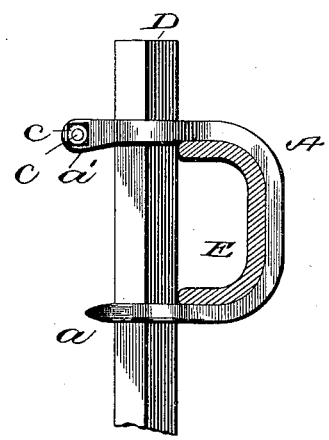

In said drawings, Figure 1 is a perspective view of the preferred form of clip detached. Fig. 2 is a top plan view thereof as employed to connect a harrow tooth and bar. Fig. 3 is a side view of Fig. 2, and Fig. 4 is a perspective view of a modification of the clip.

The clip A is roughly C-shaped, being bent to conveniently fit a round or U-shaped harrow-bar. The lower end $a$ of the clip has an angular vertical opening B in it, and the upper end of the clip is split or bifurcated into opposite similar arms $a'$ $a'$, the said arms having eyes $a^2$ on their extremities for the passage of a horizontal bolt C, and just in rear of the eyes and between the arms is an angular opening B', vertically above opening B in the lower end of the clip, so that an angular harrow-tooth D can be slipped through the opposite ends of the clip, as shown in Fig. 3. The split in the upper end of the clip extends backward to about the bend thereof, as shown, so as to allow the arms to be clamped upon a tooth, and they are preferably tempered sufficiently to cause them to slightly separate when the bolt is loosened.

In use the clips are first slipped over the harrow-bar E. Then a harrow-tooth D, angular in cross-section, is slipped through eyes B B', and then nut $c$ on bolt C is tightened, so as to clamp the upper end of the tooth between arms $a'$. The clip is so proportioned to the tooth and bar that the inclined surfaces of the square or diamond shaped openings B B' engage with the sides of the tooth, and when the bolt C is tightened the upper or outer surface of the tooth acts as an inclined plane, upon which the clip is drawn toward the bar and the tooth with equal force pressed against the front end thereof, and the combination is thus firmly and securely bound together.

Figure 4:
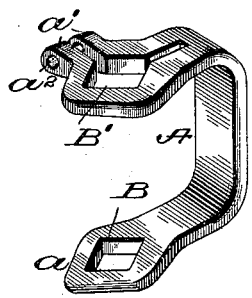

In Fig. 4 the clip is constructed substantially as described, with the exception that the eyes $a^2$ are placed at the side of opening B' instead of at the front end thereof, one arm $a'$ consequently being longer than the other; but the change is so obvious mechanically that further description is unnecessary.

Having thus described my invention, what I therefore claim as new, and desire to secure by Letters Patent thereon, is—

1. A harrow-tooth fastening consisting of an approximately C-shaped clip, having openings in its opposite ends for the passage of a harrow-tooth, and one end being split longitudinally of the opening and provided with eyes for the passage of a securing-bolt, whereby the tightening of the bolt clamps the tooth rigidly in the clip, for the purpose and substantially as described.

2. The combination of the harrow-bar, and a clip fitted to the bar and having angular openings in its upper and lower ends for the passage of a harrow-tooth; and the upper end of the clip being bifurcated, and the bifurcations provided with opposite eyes, and a bolt transfixing said eyes, and a nut on the bolt whereby the tightening of the nut on the bolt clamps the tooth rigidly in the clip, substantially as and for the purpose described.

3. The combination of a harrow-bar, an approximately C-shaped clip fitted thereto having vertical angular openings in its opposite ends for the passage of a harrow-tooth, the upper end of the clip being split longitudinally of the opening therein and the bifurcations provided with eyes; with a bolt transfixing said eyes, a nut on said bolt, and an angular harrow-tooth passing through the openings of the clip, whereby the tightening of the nut on the bolt clamps the tooth rigidly in the clip, all substantially as and for the purpose set forth.

In testimony that I claim the foregoing as my own I affix my signature in presence of two witnesses.

JOHN I. HOKE.

In presence of—
　JAS. DUSHANE,
　ISABELLA MCINTYRE.